(12) United States Patent
Akgun et al.

(10) Patent No.: US 11,307,314 B2
(45) Date of Patent: Apr. 19, 2022

(54) APPARATUS, SYSTEM, AND METHOD FOR RADIATION HARDENED PLASTIC AND FLEXIBLE ELASTOMER SCINTILLATOR

(71) Applicant: University of Iowa Research Foundation, Iowa City, IA (US)

(72) Inventors: Ugur Akgun, Iowa City, IA (US); Yasar Onel, Coralville, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 202 days.

(21) Appl. No.: 16/061,533

(22) PCT Filed: Dec. 20, 2016

(86) PCT No.: PCT/US2016/067776
§ 371 (c)(1),
(2) Date: Jun. 12, 2018

(87) PCT Pub. No.: WO2017/112670
PCT Pub. Date: Jun. 29, 2017

(65) Prior Publication Data
US 2020/0264323 A1    Aug. 20, 2020

Related U.S. Application Data

(60) Provisional application No. 62/270,206, filed on Dec. 21, 2015.

(51) Int. Cl.
| | |
|---|---|
| *G01T 1/203* | (2006.01) |
| *C09K 11/02* | (2006.01) |
| *C09K 11/06* | (2006.01) |
| *G01T 1/20* | (2006.01) |

(52) U.S. Cl.
CPC ............ *G01T 1/2033* (2013.01); *C09K 11/02* (2013.01); *C09K 11/06* (2013.01); *G01T 1/2002* (2013.01); *G01T 1/2006* (2013.01); *C09K 2211/1007* (2013.01); *C09K 2211/14* (2013.01)

(58) Field of Classification Search
None
See application file for complete search history.

(56) References Cited

U.S. PATENT DOCUMENTS

| | | |
|---|---|---|
| 5,110,500 A | 5/1992 | Walker |
| 5,298,189 A | 3/1994 | Kauffman |
| 5,587,112 A | 12/1996 | Kauffman et al. |
| 2009/0296087 A1 | 12/2009 | Dyshkant et al. |

(Continued)

OTHER PUBLICATIONS

Z. W. Bell et al. "Boron-Loaded Silicone Rubber Scintillators" IEEE Transactions on Nuclear Science, vol. 51, No. 4, Aug. (2004).*

(Continued)

*Primary Examiner* — Edwin C Gunberg
(74) *Attorney, Agent, or Firm* — Smith Gambrell & Russell LLP

(57) ABSTRACT

A scintillating material that is a radiation hardened plastic and flexible elastomer is disclosed. The material is useful in a wide range of high energy particle environments and can be used to create detectors. Such detectors can be used in physics experiments or in medical treatment or imaging. The scintillator can be radiation hardened so as to allow for an extended lifetime over other materials.

18 Claims, 3 Drawing Sheets

(56) References Cited

U.S. PATENT DOCUMENTS

| | | |
|---|---|---|
| 2011/0095178 A1 | 4/2011 | Giannakopulos et al. |
| 2011/0192981 A1* | 8/2011 | Menge .................... G01T 1/203 |
| | | 250/362 |
| 2011/0222659 A1 | 9/2011 | Jorritsma et al. |

OTHER PUBLICATIONS

International Search Report issued in the parent application, PCT/US2016/06776, dated May 19, 2017; 4 pages.

* cited by examiner

APPARATUS, SYSTEM, AND METHOD FOR RADIATION HARDENED PLASTIC AND FLEXIBLE ELASTOMER SCINTILLATOR

CROSS-REFERENCE TO RELATED APPLICATION

This application claims priority from U.S. Provisional Patent Application No. 62/270,206, filed Dec. 21, 2015, which is incorporated herein in its entirety.

STATEMENT REGARDING FEDERALLY SPONSORED RESEARCH

This invention was made with government support under Grant No. DE-SC0010113 awarded by the United States Department of Energy. The government has certain rights in the invention.

FIELD OF TECHNOLOGY

The present invention relates to scintillating materials. More specifically, the present invention relates to radiation hardened elastomer scintillating materials and devices based on those materials. The apparatus, system, and methods can be used in high energy physics and medical physics experiments.

BACKGROUND OF THE INVENTION

Scintillating materials are a class of materials that exhibit luminescence when excited by ionizing radiation. When radiation comprised of electrically charged particles, such as α-rays and β-rays, penetrate particular substances, they can ionize, excite and/or dissociate atoms or molecules of the substance, which in turn reduces the energy of the particles. The energy lost by the radiation and accumulated in the substance is either converted into energy in the form of heat or emitted in the form of light. If the substance is fluorescent, phosphorescent, or contains a fluor, the energy is converted and emitted in the form of light with greater efficiency. This emitted light is often at visible wavelengths. This conversion of energy from the ionizing radiation into emitted light is termed "scintillation." For the case of radiation comprising gamma rays and neutron rays, which do not have an electric charge, a similar phenomenon is induced by the action of secondary charged particles. The secondary charged particles are produced when the non-electrically charged radiation interacts with the substance.

Scintillating materials are commonly used in fluorescent tubes, radiation detectors, high energy particle physics experiments, medical applications that use accelerators, detection of radioactive mineral deposits, detection and measurement of radioactive contamination, or any application requiring the detection and measurement of ionizing radiation. Particle tracking devices and calorimeters in high energy physics are crucial for new discoveries via measurements. However, future experiments may require calorimeters that work in very high radiation environments for many years, operate at high frequency and with sub-nanosecond time resolution, and/or can be configurable in compact and dense units. Current scintillating materials suffer from numerous deficiencies. These scintillating materials often break down when used in high radiation environments. Also, the present generation of materials has difficulty operating at high frequency and with sub-nanosecond time resolution.

Radiation hardening is the act of making electronic components and systems resistant to damage or malfunctions caused by ionizing radiation (including particle radiation and high-energy electromagnetic radiation), such as those encountered in outer space and high-altitude flight, around nuclear reactors and particle accelerators, or during nuclear accidents or nuclear warfare. The radiation hardness characteristics of a material are particularly important in high energy physics applications. A scintillating material that is not radiation hardened may result in a decrease of light output because of damage to the emitting center (e.g., from a chromophore) as a result of the radiation damage to the fluor. Furthermore, color centers may be generated upon irradiation. These color centers cause additional attenuation of the emitted light and reduce the scintillation efficiency of detectors. This change in scintillation efficiency then requires recalibration due to changes in the material over time. These changes can also become localized within the detector, creating further calibration challenges. Thus, scintillating materials that are radiation hardened are of particular interest.

To address the challenges in current scintillating materials, a radiation hardened elastomer scintillating material is needed.

SUMMARY OF INVENTION

The present invention relates to a material and application of the material for use in a high radiation environment. These environments may include, among others, particle accelerators, high energy physics experiments, medical treatments using high energy radiation, and nuclear devices. The material may be useful to measure the energy of a particle and track its direction. The energy can be measured when the particle passes through an embodiment of the invention.

The present invention further relates to a scintillating material. In an embodiment, the material is appropriate for particle detectors with an intense light output around 400 nm and very little light or transmission loss after proton irradiation up to $4 \times 10^5$ Gy.

Differing embodiments of this disclosure may be used as detectors in medical imaging and treatments. The present invention, according to an embodiment, can be applied to medical applications that use accelerators, like proton therapy, Positron Emission Tomography (PET), Computerized Axial Tomography (CAT), and Computed Tomography (CT) imaging systems. The scintillator modules can be custom fitted into the form, fit and function of existing (mainly crystal or semiconductor) detectors for CAT, PET and Gamma Camera imaging machines with superior performance and longer life. Arrays of these detectors can be adapted for precision radiation, gamma knife, and proton radiation therapy, particularly because of their wide dynamic range and resistance to radiation.

The present invention, according to various further embodiments, can be employed as part of detectors used in industrial and instrumentation applications. The compactness, reliability, and speed of the radiation hardened elastomer scintillator based detectors enable high resolution x-ray, gamma-ray, and neutron examination of large parts, such as airframes and other large vehicles, as well as high speed examination of smaller parts, such as turbine blades and high precision 3D electronic chips. The radiation hardened elastomer scintillator based detectors can also be integrated into satellite-based platforms, such as for astrophysics research. Radiation hardened elastomer scintillator based detectors also have uses in the Energy Amplifier concept for using Thorium as fuel, as the detectors are ideal for monitoring and control of these power plants.

In embodiments, this approach to radiation detection relates to the production of devices that are a cheaper and more effective way to measure particles. Devices may use this material as the primary method of reconstructing images, such as is done in PET imaging, and as detectors get larger and larger, cheaper ways of producing huge detectors in high energy physics experiments are possible using the radiation hardened elastomer scintillating material. Certain embodiments may also enable a high measurement efficiency of particle energy. The present invention, according to an embodiment, increases the measurement efficiency over prior art techniques. Other embodiments may have a high degree of longevity in high radiation environments.

The present invention also relates to reduced technological complexity. In some embodiments of the present invention, the complexity of devices used to make measurements of high energy particles is reduced, as fewer components are needed. This reduction in component count can also decrease the cost of the detectors. Furthermore, the construction of detectors can be made easier and scale better to smaller and larger experiments.

Numerous other embodiments are described throughout herein. All of these embodiments are intended to be within the scope of the invention herein disclosed. Although various embodiments are described herein, it is to be understood that not necessarily all objects, advantages, features or concepts need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein. These and other features, aspects, and advantages of the present invention will become readily apparent to those skilled in the art and understood with reference to the following description, appended claims, and accompanying figures, the invention not being limited to any particular disclosed embodiment(s).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical and structural changes may be made to the embodiments without departing from the spirit and scope of the present teachings. The following detailed description is therefore not to be taken in a limiting sense, and the scope of the present disclosure is defined by the appended claims and their equivalents.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
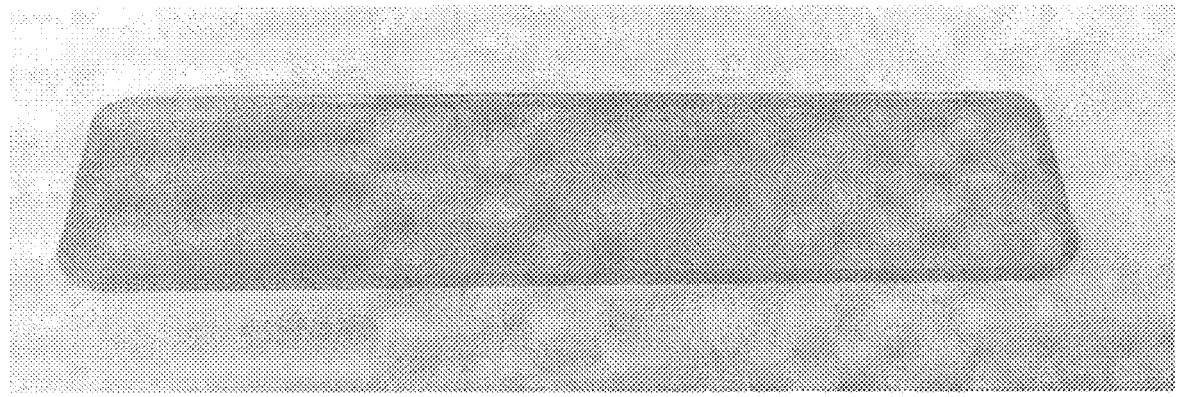
FIG. 1 is a photograph of a radiation hardened scintillating elastomer, according to an embodiment of the present invention.

FIG. 1 is a photograph of a radiation hardened scintillating elastomer, according to an embodiment of the present invention.

The present invention, according to an embodiment, uses polysiloxanes that are relatively optically transparent while simultaneously having resistance to damage when exposed to ionizing radiation. These radiation hardened materials can survive high dosages of radiation, including, in an embodiment, more than $10^7$ (i.e. 10,000,000) rad.

A siloxane is a functional group having a structural formula of:

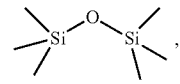

where the Si—O—Si linkage may be largely responsible for the characteristic chemical reactions of those molecules. Chains can be made from silicon oxide due to their more stable bonding than, for example, silicon-silicon bonding. Siloxanes may be made from various techniques, including step-growth polymerization and ring-opening copolymerization.

Polysiloxanes are among the most important organosilicon polymers used in polymer chemistry Step-growth polymerization of linear polysiloxanes include homocondensations of silanol-ended siloxanes or heterocondensations of silanol-ended species with monomers.

Polysiloxanes of the following structural formula which are substantially optically transparent may be employed in the practice of the invention:

$$(R_n SiO_{\frac{4-n}{2}})_m$$

wherein n is an integer from 1 to 3; m is the degree of polymerization; and R may be the same or different where n is 2 or 3 and is, e.g., lower alkyl such as methyl and ethyl;

cycloalkyl, such as cyclohexyl; phenyl, biphenyl, naphthyl, vinyl, hydrogen or other bulky aromatic group. A polysiloxane wherein R is entirely methyl has no scintillating properties and requires an addition of a scintillating substance.

In a polysiloxane wherein at least some of the R groups are phenyl, the polymer itself has scintillating characteristics. The polymer can then more efficiently transfer electromagnetic energy into the dissolved fluorescent organic additives. Thus, phenyl-substituted polysiloxanes, according to an embodiment, require lesser amounts of dissolved scintillator. The light output from the polysiloxane scintillator depends, among other factors, upon the phenyl concentration of the polymer. In addition, phenyl groups enhance the bulk modulus, radiation resistance and mechanical properties of the plastic.

Figure 2:
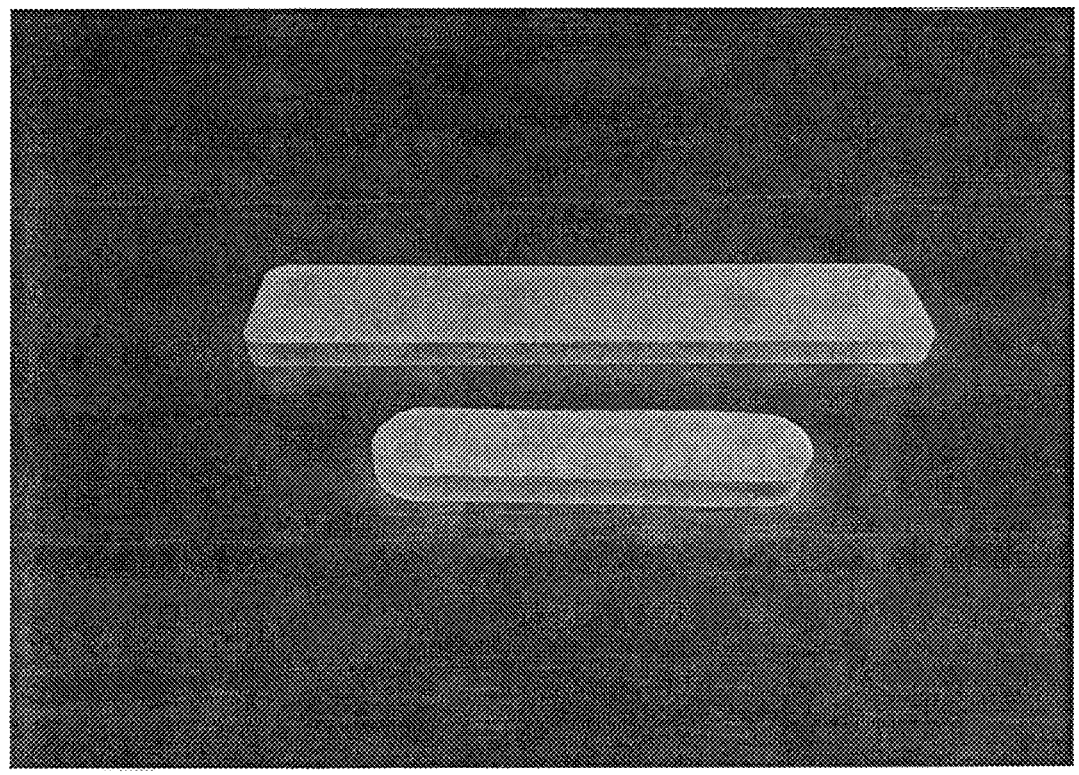
FIG. 2 is a photograph of radiation hardened scintillating elastomers scintillating with ultraviolet light source, according to an embodiment of the present invention.

FIG. 2 is a photograph of radiation hardened scintillating elastomers scintillating with ultraviolet light source according to an embodiment of the present invention. When exposed to high energy radiation, the elastomer material, according to an embodiment of the present invention, will produce light.

Figure 3:
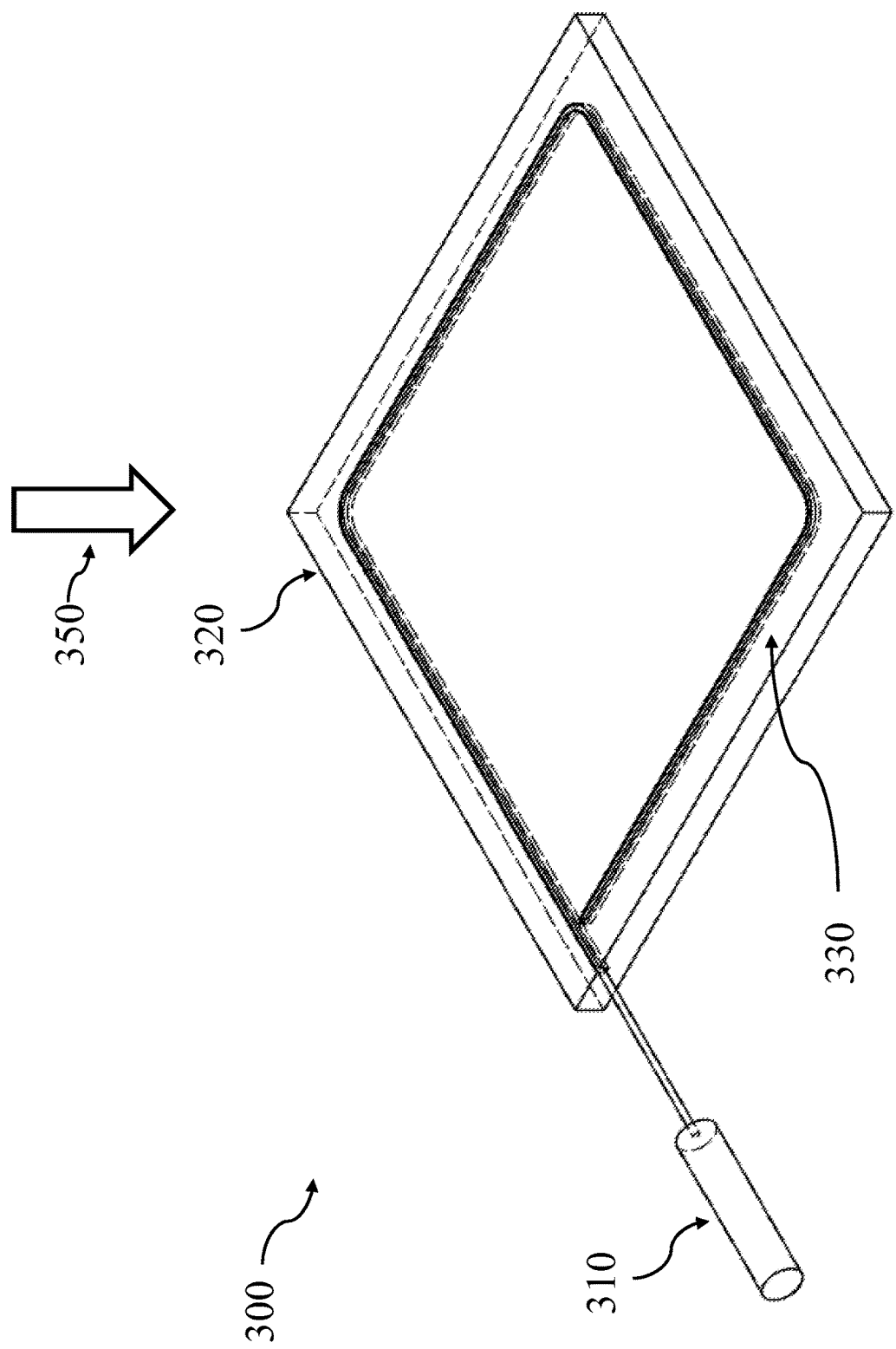
FIG. 3 illustrates a detection device 300 using the scintillating material, according to an embodiment of the present invention.

FIG. 3 illustrates a detection device 300 using the scintillating material, according to an embodiment. An optical waveguide 330, such as a fiber optic cable, is placed around the scintillator tile 320. A beam of radiation 350 is incident on the scintillator tile 320, causing it to scintillate. The beam of radiation can be any of a number of different particle types, such as p, n, gamma, neutron, UV laser, or RA sources. The light that is generated is directed by the optical waveguide 330 into a detector 310, such as a photomultiplier tube or a silicon photomultiplier. The detector can include additional hardware, such as read-out devices, recorders, or computers.

The radiation hardened elastomer scintillators, according to an embodiment, are produced by the following method. Embodiments of these scintillators can be made with a variety of base materials, which range from soft elastomers to rigid plastics. For a flexible elastomer scintillator, an optically clear flexible polysilicone base material is used. In alternative embodiments, a hard plastic base material is used. The various base materials, such as the plastic, may or may not be radiation hardened as desired for the particular use case.

A polysiloxane base material of commercially available HARDSIL™ material is used, according to an embodiment. A 99% by weight HARDSIL™ material is combined with the primary fluor, the secondary fluor and the curing agent. Before adding the curing agent to the mix, the solubility of the primary and secondary fluors are determined by adding, stirring and incrementing amounts of the fluors into the HARDSIL™ while heating on a hot plate until the fluors no longer dissolved in the liquid or until 2% by weight was reached.

In an embodiment of the present invention, bis-MSB dissolves readily at 2% by weight in the HARDSIL™ base. If the amounts are added incrementally, pTP dissolves in HARDSIL™ up to 2% by weight at higher temperatures. The HARDSIL™/pTP mixture may need to be heated to approximately 65° C. in order for the pTP to dissolve at 1% by weight and approximately 90° C. to dissolve at 2% by weight. Visible evaporation of the HARDSIL™ occurs near 100° C., and careful control of the temperature may be required.

Note that the solubility of each fluor is different and the particular suitability of a method for incorporating the fluor in the polysiloxane depends on the concentration of fluor which is desired. The amount can be adjusted to meet a particular need.

A mold is provided for the mix to cure in. This mold can be sized and shaped to the preferred scintillator design, such as, according to an embodiment, rectangular rods having a thickness of 6.5 mm. The mold is comprised of steel with a Teflon coating. In an embodiment, the mold is preferably preheated to 150° C. in a curing furnace to prevent the fluors from precipitating out of the liquid mixture and/or creating a density gradient while curing. The fully mixed liquid scintillator is then poured into the mold and cured for six hours at 150° C. and two hours at 200° C., according to an embodiment. After curing, the edges of the scintillators are then polished to a mirror finish before testing. Polishing can be performed using a Buehler polishing machine, model ECOMET 3, using grit 320 or higher polishing paper.

In a further embodiment, an alternative process for producing the radiation hardened scintillators is provided. A base material of Gelest HARDSIL™ CC is used along with a catalyst of dicumyl peroxide. The fluors (scintillators) added are p-terphenyl and 1,4-Bis(2-Methylstyryl)benzene. Concentrations of 0.91% (by weight) of each scintillator and dicumyl peroxide are used.

In general, the scintillation compounds and peroxide catalyst are incorporated into the base resin at 100 C, and tile forms are created by open-face castings using PTFE molds. The curing cycle is 8 hours at 130 C under nitrogen gas. The post cure cycle is 2 hours at 200 C, also under nitrogen gas.

Figure 4:
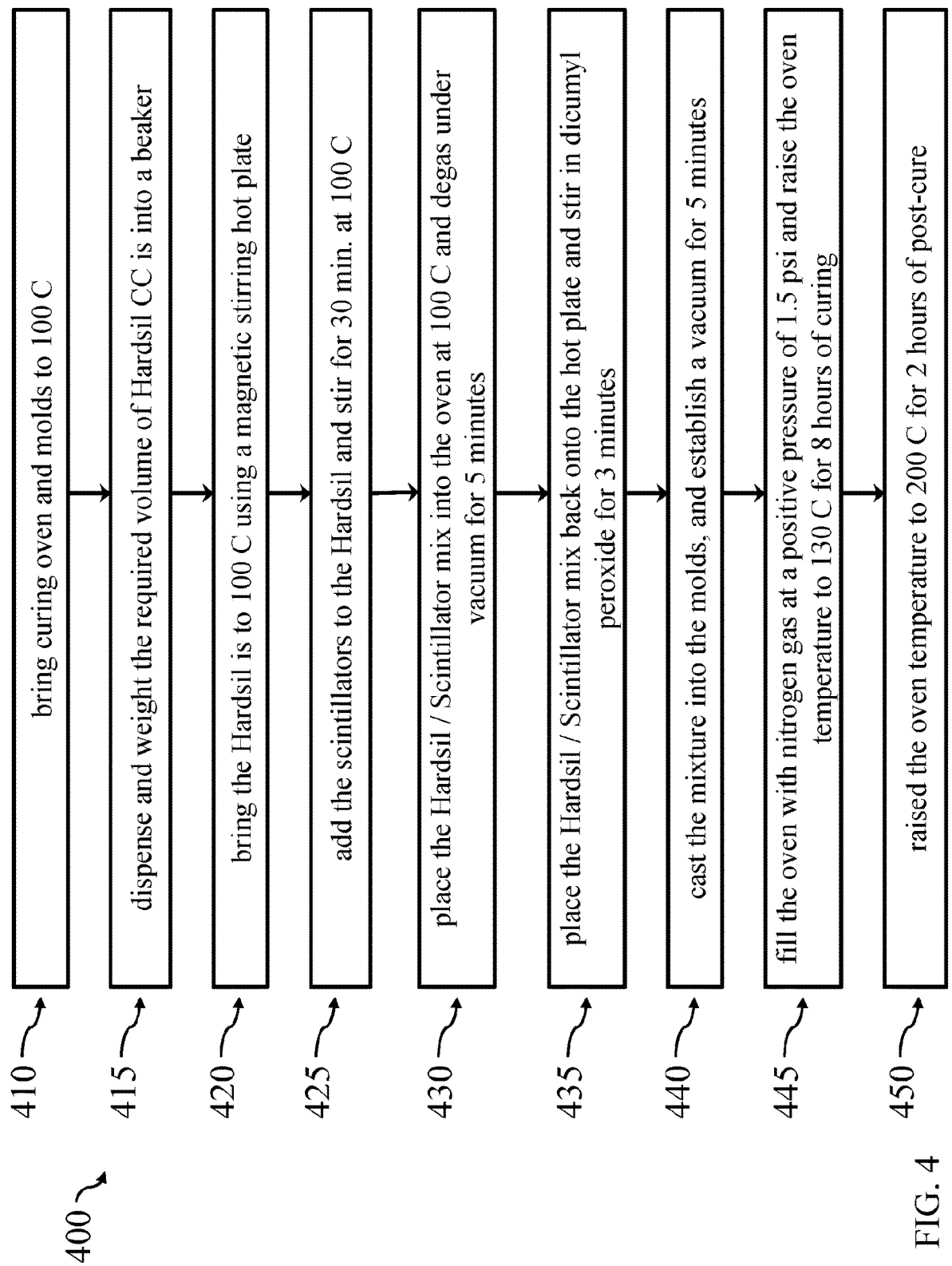
FIG. 4 illustrates a flow of the detailed manufacturing process, according to an embodiment of the present invention.

The detailed process 400 is shown in FIG. 4, according to an embodiment. In step 410, the curing oven and molds are brought to 100 C. In step 415, the required volume of HARDSIL™ CC is dispensed into a beaker and weighed. In step 420, using a magnetic stirring hot plate, the HARDSIL™ is brought to 100 C. Temperature is taken with a thermocouple placed underneath the beaker. The scintillators and peroxide are weighed in separate cups. In step 425, the scintillators are added to the HARDSIL™ and stirred for 30 min. at 100 C. In step 430, the HARDSIL™/Scintillator mix is placed into the oven at 100 C and degassed under vacuum for 5 minutes. In step 435, the HARDSIL™/Scintillator mix is placed back onto the hot plate and dicumyl peroxide stirred for 3 minutes. In step 440, the mixture is then cast into the molds, and a vacuum is established again for 5 minutes. In step 445, the oven is then filled with nitrogen gas at a positive pressure of 1.5 psi, and the oven temperature is raised to 130 C for 8 hours of curing. In step 450, the oven temperature is then raised to 200 C for 2 hours of post-cure. Finally the oven is shut down and allowed to cool slowly to room temperature before removing the castings.

The post cure heating removes the peroxide break down products (acetophenone, phenyl-2-propanol). Failure to execute the post cure will result in a bloom appearing on the surface of the scintillator tile. Furthermore, a 2.25% dimensional shrinkage is observed in the cured forms. Machining can be done to refine the dimensions of the pieces.

The above process can be used to create tiles of size 20 mm×100 mm×5 mm. Larger parts can also be made using the same process. In other embodiments, different base material can be used. Other, less expensive base materials allow for extruded forms and fibers to be produced and potentially lower costs.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. To the extent necessary to understand or complete the disclosure of the present invention, all publications, patents, and patent applications mentioned herein are expressly incorporated by reference therein to the same extent as though each were individually so incorporated.

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A scintillating material for detecting high energy particles comprising:
    a base material selected from the group consisting of a siloxane material and a plastic;
    a primary fluor melted into the base material by heating the base material to between 65° C. and 100° C.; and
    a secondary fluor melted into the base material, wherein the scintillating material has a light output with little or no transmission loss after exposure to radiation dosages of up to approximately $10^5$ Gy.

2. The scintillating material of claim 1, wherein the primary fluor comprises bis-MSB.

3. The scintillating material of claim 1, wherein the secondary fluor comprises pTP.

4. The scintillating material of claim 1, wherein the base material comprises HARDSIL.

5. The scintillating material of claim 1, wherein the primary fluor comprises bis-MSB and the secondary fluor comprises pTP.

6. The scintillating material of claim 1, wherein the scintillating material is configured to produce a light output of 400 nm.

7. The scintillating material of claim 1, wherein the base material comprises a siloxane substantially optically transparent.

8. The scintillating material of claim 7, wherein the siloxane comprises a polysiloxane with a structural formula of

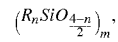

wherein in R comprises phenyl.

9. The scintillating material of claim 1, wherein the scintillating material is radiation hardened based upon the selection of a radiation hardened base material, a radiation hardened first fluor, and a radiation hardened second fluor.

10. A method for creating a scintillating material, the method comprising:
    providing a base material, wherein the base material is selected from the group consisting of a siloxane material and a plastic;
    melting a primary fluor into the base material by heating the base material between 65° C. and 100° C.;
    melting a secondary fluor into the base material; and
    melting a curing agent into the base material to form the scintillating material, wherein the scintillating material is formed to be radiation hardened to maintain production of a light output with little or no transmission loss after exposure to high radiation dosages of up to approximately $10^5$ Gy.

11. The method of claim 10, wherein melting a primary fluor comprises heating the base material until the primary fluor dissolves.

12. The method of claim 10, wherein the base material comprises HARDSIL, the primary fluor comprises bis-MSB, and the secondary fluor comprises pTP.

13. The method of claim 10, wherein the curing agent comprises dicumyl peroxide.

14. The method of claim 10, wherein the base material comprises 99% HARDSIL.

15. The method of claim 10, wherein the base material is heated to between 65 C and 100 C before adding the first fluor and the second fluor.

16. The method of claim 15, wherein post curing comprises applying heat of approximately 200 C to the scintillating material for approximately 2 hours.

17. The method of claim 10, further comprising the steps of:
    degassing the scintillating material under vacuum;
    applying nitrogen gas at a positive pressure of approximately 1.5 psi while applying heat of approximately 130 C for approximately 8 hours; and
    post-curing the scintillating material to remove peroxide break down products.

18. An apparatus for detecting high energy particles comprising:
    a scintillating material comprising;
        a base material;
        a primary fluor comprising bis-MSB melted into the base material between 65° C. and 100° C.; and
        a secondary fluor comprising pTP,
    wherein the scintillating material is formed by being degassed under vacuum, having nitrogen gas applied at a positive pressure while under heat, and post-cured to remove peroxide break down products wherein the scintillating material is configured to resist damage from high radiation dosages of approximately $10^5$ Gy and still generate a light output with little or no transmission loss.

* * * * *